United States Patent
Ochi et al.

(10) Patent No.: US 7,349,664 B2
(45) Date of Patent: Mar. 25, 2008

(54) COMMUNICATION SYSTEM AND METHOD THEREOF

(75) Inventors: Daisuke Ochi, Yokohama (JP); Kenichi Yamazaki, Hino (JP); Hisashi Oguma, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 521 days.

(21) Appl. No.: 10/638,421

(22) Filed: Aug. 12, 2003

(65) Prior Publication Data

US 2004/0033779 A1 Feb. 19, 2004

(30) Foreign Application Priority Data

Aug. 14, 2002 (JP) ............... 2002-236674

(51) Int. Cl.
*H04B 7/15* (2006.01)
(52) U.S. Cl. ........................ 455/11.1; 455/15
(58) Field of Classification Search ............ 455/7, 455/11.1, 13.1, 16, 511, 423, 15
See application file for complete search history.

(56) References Cited

U.S. PATENT DOCUMENTS

| 5,983,073 A * | 11/1999 | Ditzik ................ 455/11.1 |
| 6,141,533 A * | 10/2000 | Wilson et al. ......... 455/11.1 |
| 6,748,212 B2 * | 6/2004 | Schmutz et al. ....... 455/424 |

| 2002/0023157 A1 | 2/2002 | Lo et al. |
| 2002/0083145 A1 | 6/2002 | Perinpanathan |
| 2002/0099829 A1 | 7/2002 | Richards et al. |

FOREIGN PATENT DOCUMENTS

| JP | 10-23071 | 1/1998 |
| JP | 2002-197005 | 7/2002 |
| WO | WO 02/05507 A2 | 1/2002 |

OTHER PUBLICATIONS

A. S. Tanenbaum, Computer Networks, XP-002093858, pp. 685-691, "Computer Networks", 1996.
R. Fielding, et al., "Hypertext Transfer Protocol—HTTP/1.1", Network Working Group Request for Comments: 2068, Category: Standards Track, XP-15007852, Jan. 1997, pp. 1-162.

* cited by examiner

*Primary Examiner*—Edward F. Urban
*Assistant Examiner*—Tu X. Nguyen
(74) *Attorney, Agent, or Firm*—Oblon, Spivak, McClelland, Maier & Neustadt, P.C.

(57) ABSTRACT

A communication system able to smoothly provide services and make requests for services even when the communication link is not constantly connected. The communication system includes a user node, a corresponding node, and a relay node constantly connected to the corresponding node. The relay node acts as proxy for the user node to transmit signals to or receive signals from the corresponding node. The relay node and the user node act as a virtual node with respect to the corresponding node, and the virtual node is identified by the address of the relay node.

27 Claims, 6 Drawing Sheets

COMMUNICATION SYSTEM AND METHOD THEREOF

BACKGROUND OF THE INVENTION

1. Field of the Invention

The present invention relates to a communication system, a relay node and a user node therein, and a method thereof.

2. Description of the Related Art

In the related art, communication systems are based on an end-to-end communication model, such as the client-server model, or the peer to peer model. In these models, communication sessions are controlled at nodes at the two ends of a communication link, and relay nodes need to be provided for control of each communication session. In such a communication system, communication terminals functioning as end-nodes, such as mobile terminals, may provide or make requests for various services.

In a mobile communication system, however, because mobile terminals can be freely moved, and the quality of the electrical signals changes frequently, the radio link between a mobile terminal and its party is apt to be disconnected. In addition, a radio link generally has a narrower communication bandwidth than a fixed link such as a cable, therefore, if the communication link is disconnected, the mobile terminals may not continue to provide or make requests for services, or the service is stopped. This problem occurs not only in the case of mobile terminals in a mobile communication system, but also in the case wherein one of the end nodes of a communication link is not connected constantly. For a service provider that is not constantly connected, when the link is disconnected, the service provider cannot respond to any request nor provide any service.

In other words, in a communication system wherein the communication link is not constantly connected, provision of and request for services cannot be smoothly performed.

In the related art, methods involving Web servers or mobile file servers are used to overcome difficulties in an unstable communication system utilizing such a non-constantly connected link, such as a radio link. However, these methods are used only for specified types of service and protocols, and are not applicable to the communication systems described above.

SUMMARY OF THE INVENTION

Accordingly, it is a general object of the present invention to solve the above problem of the related art by providing a communication system, a relay node and a user node therein, and a method thereof able to smoothly provide and make requests for services even if a node is connected to a network via a non-constantly connected communication link.

A first specific object of the present invention is to provide a communication system, a relay node and a user node in the communication system, and a method of the communication system; in the communication system a non-constantly connected communication link is separated from a constantly connected communication link to enable smooth provision of and request for services without influence of conditions of the non-constantly connected communication link.

A second specific object of the present invention is to provide a communication system, a relay node and a user node in the communication system, and a method of the communication system able to smoothly provide services by establishing a scheme enabling a user or a user program to confirm the status of a non-constantly connected communication link, or by eliminating the necessity of such a confirmation.

A third specific object of the present invention is to provide a communication system, a relay node and a user node in the communication system, and a method of the communication system able to improve communication efficiency and smooth provision of and request for services by separating a slow and non-constantly connected communication link from a fast and constantly communication link.

To attain the above object, according to a first aspect of the present invention, there is provided a communication system comprising a user node, a corresponding node able to transmit signals to or receive signals from the user node, and a relay node that is constantly connected to the corresponding node, the relay node being able to transmit signals to or receive signals from the user node, wherein the relay node is able to act as proxy for the user node to transmit signals to or receive signals from the corresponding node.

Preferably, the user node and the relay node act as a virtual node with respect to the corresponding node, the virtual node being identified by a node address of the relay node. Further, data processed by the relay node may be synchronized with data processed by the user node.

Preferably, the communication system may further comprise a link monitoring unit configured to monitor a communication link between the user node and the relay node. Further, the communication system may further comprise a node information management unit configured to store information of the user node and the relay node.

Preferably, in the communication system the user node is able to transmit signals to or receive signals from the corresponding node without going through the relay node.

According to the above aspect of the invention, a relay node constantly connected to a corresponding node is provided, and both the relay node and the corresponding node are able to transmit signals to or receive signals from the user node through communication links.

Because the relay node is constantly connected to the corresponding node, when the communication link between the user node and the corresponding node is disconnected, the relay node acts as proxy for the user node to communicate with the corresponding node, hence service provision and requests between the user node and the corresponding node can be performed smoothly.

To attain the above object, according to a second aspect of the present invention, there is provided a relay node in a communication system including a user node, a corresponding node able to transmit signals to or receive signals from the user node, and the relay node able to transmit signals to or receive signals from the user node. The relay node is constantly connected to the corresponding node, and able to act as proxy for the user node to transmit signals to or receive signals from the corresponding node.

Preferably, the user node and the relay node act as a virtual node with respect to the corresponding node, and the virtual node is identified by a node address of the relay node.

Accordingly, the user node and the relay node as a whole behave like one node, that is, the virtual node, with respect to the corresponding node or other nodes outside. Therefore, the corresponding node is able to request services from or provide services for the user node without being aware of which of the user node and the relay node is to be accessed.

Preferably, the data processed by the relay node may be synchronized with data processed by the user node. In addition, the relay node may further comprise a link monitoring unit configured to monitor the communication link between the user node and the relay node, and the relay node may further comprise a node information management unit configured to store information of the user node and the relay node.

Accordingly, it is possible to establish a scheme for a user or a user program to confirm the status of a non-constantly connected communication link, and it may also be possible to eliminate the necessity of such a confirmation. Furthermore, it is possible to improve communication efficiency. For example, the relay node may convert the format and size of data from the corresponding node to match the communication capability of the user node, and as a result, no useless data are sent to the user node.

To attain the above object, according to a third aspect of the present invention, there is provided a user node in a communication system including the user node, a corresponding node able to transmit signals to or receive signals from the user node, and a relay node able to transmit signals to or receive signals from the user node, the user node being able to be replaced by the relay node which is constantly connected to the corresponding node and acts as proxy for the user node to transmit signals to or receive signals from the corresponding node.

Preferably, the user node and the relay node act as a virtual node with respect to the corresponding node, and the virtual node is identified by a node address of the relay node. More preferably, data processed by the user node are synchronized with data processed by the relay node.

Preferably, the user node may further comprise a link monitoring unit configured to monitor the communication link between the user node and the relay node. The user node may further comprise a node information management unit configured to store information of the user node and the relay node.

Preferably, the user node is able to transmit signals to or receive signals from the corresponding node without going through the relay node.

To attain the above object, according to a fourth aspect of the present invention, there is provided a method of operating a communication system comprising a user node, a corresponding node able to transmit signals to or receive signals from the user node, and a relay node able to transmit signals to or receive signals from the user node, comprising: a first step of constantly connecting the relay node to the corresponding node, and a second step of transmitting or receiving signals between the user node and the corresponding node with the relay node acting as proxy for the user node to transmit signals to or receive signals from the corresponding node.

Preferably, the second step may comprise a step of making the user node and the relay node act as a virtual node with respect to the corresponding node, and identifying the virtual node by a node address of the relay node. More preferably, the second step may comprise a step of synchronizing data processed by the relay node with data processed by the user node.

Preferably, the second step may comprise a step of monitoring a communication link between the user node and the relay node. More preferably, the second step may comprise a step of storing information of the user node and the relay node.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

Figure 1:
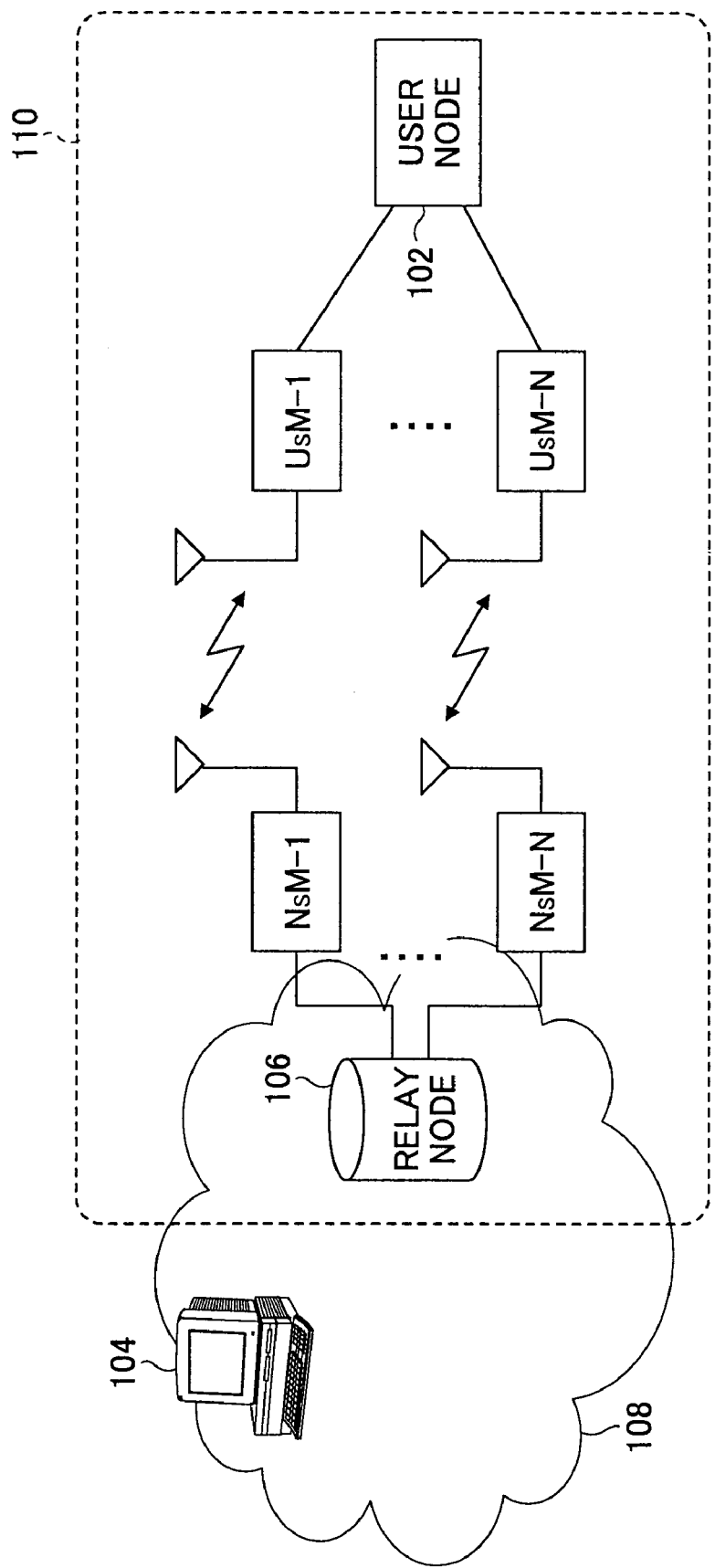
FIG. 1 is a schematic view showing a communication system according to an embodiment of the present invention.

FIG. 1 is a schematic view showing a communication system according to an embodiment of the present invention.

The communication system shown in FIG. 1 includes a user node 102, a corresponding node 104, and a relay node 106 able to communicate with the corresponding node 104 as proxy for the user node 102. For example, the user node 102 may be a mobile terminal, such as a cellular phone, and the relay node 106 may be a communication terminal such as a personal computer. Certainly, the user node 102 may also be a personal computer, or other fixed communication terminals.

The user node 102 and the relay node 106 can communicate with each other through a number of communication links. Here, the communication links may be links used in a cellular communication system, or a personal handyphone system (PHS), or a wireless LAN (Local Area Network) such as IEEE 802.11a/b/g, or any other communication systems. In this embodiment, it is assumed that the communication link is a radio communication link.

At the user node 102 and the relay node 106, modules are provided to monitor the connection status of the communication links between the two nodes. Specifically, at the user node 102, user side monitors 1 through N (denoted as UsM-1 through UsM-N) are provided, and at the relay node 106, network side monitors 1 through N (denoted as NsM-1 through NsM-N) are provided. These modules UsM-1 through UsM-N and NsM-1 through NsM-N function as communication interfaces, and provide information on the communication links for control of them. The information, for example, includes invariable or static elements such as types of the communication links and the maximum communication speed, and variable or dynamic elements such as connection status of the communication links, and the communication mode. In general, the physical bodies of the modules UsM-1 through UsM-N may be integral with the user node 102.

The relay node 106 and the corresponding node 104 are connected via a constantly connected network 108, such as cables or other fixed connections. Compared with the communication link between the user node 102 and the relay node 106, the fixed network 108 is more stable, because the communication link between the user node 102 and the relay node 106 is not constantly connected. The corresponding node 104 may be implemented to be any communication terminal able to be constantly connected to the relay node 106. It may be a mobile terminal provided wherein the relevant communication link is constantly connected.

Middleware is loaded in each of the user node 102 and the relay node 106 for coordination between the user node 102 and the relay node 106. When the respective middleware operates appropriately, the user node 102 and the relay node 106 as a whole behave like one node (referred to as "virtual node" hereinafter) 110 when viewed from the corresponding node 104 or other nodes outside. Below, for simplicity of explanation, the middleware loaded in the relay node 106 is denoted as NsA (Network Side Agent), and the middleware loaded in the user node 102 is denoted as UsA (User Side Agent).

Figure 2:
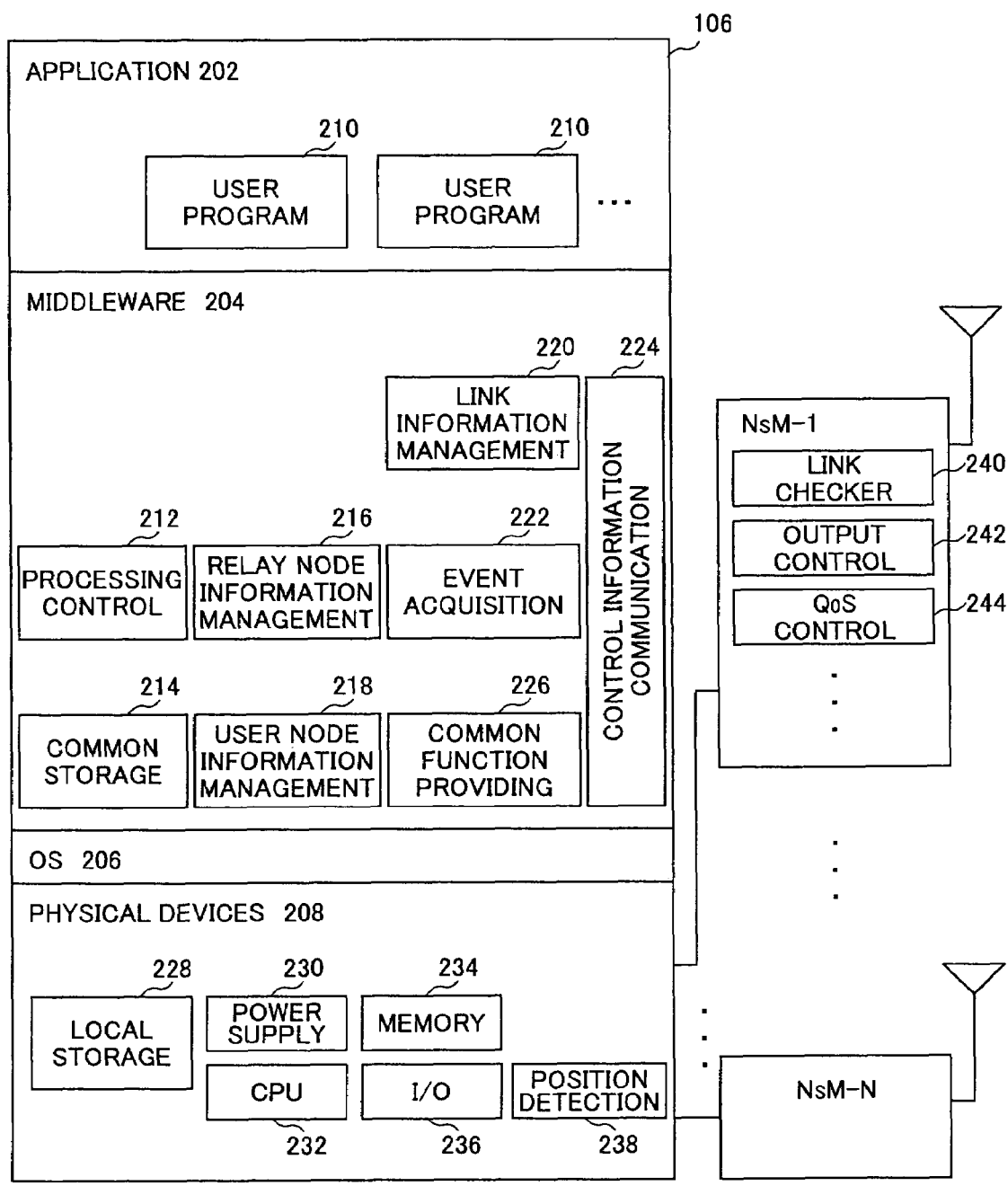
FIG. 2 is a block diagram showing functions of the relay node 106.

FIG. 2 is a block diagram showing functions of the relay node 106 loaded with the middleware NsA.

The relay node 106 is a system formed from a software system and physical devices 208. The software system includes applications 202, middleware NsA 204, and an operating system 206. Functionally, the middleware NsA 204 is between the applications 202 and the operating system 206. The applications 202 include user programs 210 loaded by users or privileged persons. Each user program 210 may be created so that it provides desired functions. As shown below, the middleware UsA having similar functions to the NsA is loaded on the user node 102.

The middleware 204 is created to realize various functions together with the user programs 210. The functions of the middleware 204 may be divided into the following sections as illustrated in FIG. 2. The functional sections include a processing control section 212, a common storage section 214, a relay node information management section 216, a user node information management section 218, a link information management section 220, an event acquisition section 222, a control information communication section 224, and a common function providing section 226. Certainly, the configuration of the middleware 204 shown in FIG. 2 is just for illustration, and alternative or additional functions may be provided to the middleware 204 when necessary.

The processing control section 212 decides how the relay node 106 and the user node 102 should operate when the relay node 106 receives a request from the corresponding node 104 (for example, a request of services). Here, the address of the relay node 106 is used as the address for identifying the virtual node 110 (referred to as node identification address), and therefore, the request from the corresponding node 104 is received first by the relay node 106. The processing control section 212 determines one target user program 210 from the user programs loaded in the relay node 106 (and/or user programs 310 loaded in the user node 102, as described below), to which the data in the signal packets transmitted from the corresponding node 104 to the virtual node 110 should be transferred. Then the processing control section 212 transfers the data in the signal packets to the selected user program. To make this selection, data types required by each user program and identification numbers related to communication sessions, such as port numbers of each user program, may be registered in the processing control section 212 beforehand by the user program, and packet signals in agreement with the registered data are transferred to the corresponding user program.

In addition to determining the target user program 210 and transferring the data in the signal packets to the target user program 210, the processing control section 212 also determines whether it is possible to transfer the packet signals to the user node 102. Specifically, when the communication link between the relay node 106 and the user node 102 is connected, and the port number given by the packet signals is registered to the processing control section 212 by a user program 310 in the user node 102, the relay node 106 transfers the packet signals to the user node 102. If the port number registered in the processing control section 212 by the user program is the same as one or more other user programs, the packet signals may be transferred according to a priority order decided in advance.

The common storage section 214 ensures the data managed and stored in the relay node 106 are accessible from the user node 102, and the data managed and stored in the user node 102 are accessible from the relay node 106. The common storage section 214 transfers the data stored in a local storage device 228, which is included in the physical devices 208 as shown in FIG. 2, to the user node 102 in units of files, volumes, or others. Similarly, the common storage section 214 reads the data from the user node 102 in units of files, volumes, or others, and stores the data in the local storage device 228. By doing this, even in case the communication link between the user node 102 and the relay node 106 is disconnected sometime later, the relay node 106 is able to maintain the communication with the corresponding node 104 using the stored data in the relay node 106.

In order to ensure consistency of data between the user node 102 and the relay node 106, one side of the user node 102 and the relay node 106 may lock all or a part of the data on the other side so as to prohibit data modification on the other side. For example, after the user node 102 reads the data from the relay node 106, it is possible to prevent the relay node 106 from rewriting its own data. But, it is preferable that the lock setting be removed at appropriate timing to update the data. Such timing may be freely specified, for example, it may be the time when the disconnected link is connected again. Alternatively, the update may be performed regularly.

The relay node information management section 216 manages information on resources of the relay node 106. The information managed by the relay node information management section 216 may include the storage capacity of the local storage device 228, CPU capability, and link speed to the fixed network 108, that is, the so-called invariable or static information, and may also include the so-called variable or dynamic information such as the remaining capacity of the local storage device 228, CPU utilization rate, and network utilization rate. Certainly, more and different elements of information may be managed by the relay node information management section 216 when necessary.

The information managed by the relay node information management section 216 may be provided to the user node 102 via the control information communication section 224, and may be accessed and controlled by user programs via the APIs (Application program Interface) provided by the common function providing section 226.

The user node information management section 218 manages information on resources of the user node 102. The user node information management section 218 is similar to the relay node information management section 216 in respect to managing information relevant to a node. The difference is in that the information managed by the user node information management section 218 is information related to the user node 102.

The information managed by the user node information management section 218 may include static information such as the storage capacity of the local storage device 228, CPU capability, types of the available communication links, and available input and output devices, and may further include dynamic information such as the remaining capacity of the local storage device 228, CPU utilization rate, network utilization rate, remaining capacity of the batteries, screen display, and other information of the user node devices. Certainly, other or different information may be managed by the user node information management section 218 when necessary.

The information managed by the user node information management section 218 may be acquired from the user node 102 via the control information communication section 224 regularly or when necessary, and may be accessed and controlled by user programs via the APIs (Application program Interface) provided by the common function providing section 226.

The link information management section 220 manages the network side monitors NsM-1 through NsM-N, each of which is provided in a communication link between the relay node 106 and the user node 102. The link information management section 220 is able to manage the information provided by each network side monitor (NsM) on the connection status of the communication link, the actual communication speed, the strength of the electrical signals, the communication quality, and mobility.

The above information may also be accessed and controlled by user programs via the APIs (Application program Interface) provided by the common function providing section 226. Because there may be a number of communication links between the relay node 106 and the user node 102, the communication efficiency can be improved by using these communication links at the same time. For example, a wireless LAN card can be used during communications via a PHS system.

The event acquisition section 222 notifies the user programs 210 of various events. As an example, reconnection of a communication link monitored by the NsM-1 may be such an event reported to the user programs 210 by the event acquisition section 222. If a user program 210 requires notification of this event, the event acquisition section 222 is on standby and detects such an event, and notifies the user programs 210 when the event occurs. Upon this notification, for example, execution of the user programs 210, which is interrupted so far due to communication disconnect, may be resumed. Users may request any desired events. For example, in addition to connection and disconnect of the communication link, it is possible to specify other kinds of events, such as elapse of a certain time period after disconnect, or occurrence of a certain number of times of disconnects. When each of these events occurs, the event acquisition section 222 reports this to the user programs 210.

When the event acquisition section 222 is on standby and waiting for a number of events, a priority order may be specified. Further, when an event is detected, the event acquisition section 222 may notify not only one user program, but also a plurality of user programs.

The common function providing section 226 provides APIs for utilizing the above numerous functions (sections). For example, the common function providing section 226 provides the user programs 210 with an API for obtaining information input from a keyboard at the user node 102, and API for screen displaying.

The network side monitors NsM-1 through NsM-N monitor the connection status of their respective communication links between the relay node 106 and the user node 102. For example, in the case of cellular communication links, the NsM may be provided in a cellular base station. Each NsM has a link checker 240 to determine the status of the communication link. The link checker 240 notifies the link information management section 220 in the relay node 106 of information such as the connection status of the communication link, the strength of the electrical wave, and the communication speed. In addition, each NsM has the function of controlling the communication link. Due to this function, each NsM may control the strength of the output electrical wave, for example, by the output control section 242, the communication quality (Q0S), for example, by the Q0S control section 244, and they may control mobility by an appropriate section.

In the relay node 106, an operating system (OS) 206 is loaded to perform system management in the relay node 106 and provide the fundamental operational environment for users. The fundamental functions provided by the OS 206 may be utilized by user programs 210 through APIs.

The relay node 106 comprises physical devices such as a local storage device 228, a power supply 230, a CPU 232, a memory 234, and an IO (input/output) device 236, and a position detector 238. Certainly, the relay node 106 may include alternative or additional physical devices when necessary. The information in the user node 102 is stored in the local storage device 228. The storage of the information is controlled by the common storage section 214 in the middleware 204. In addition to personal information of users, data created by users are also stored in the local storage device 228.

Figure 3:
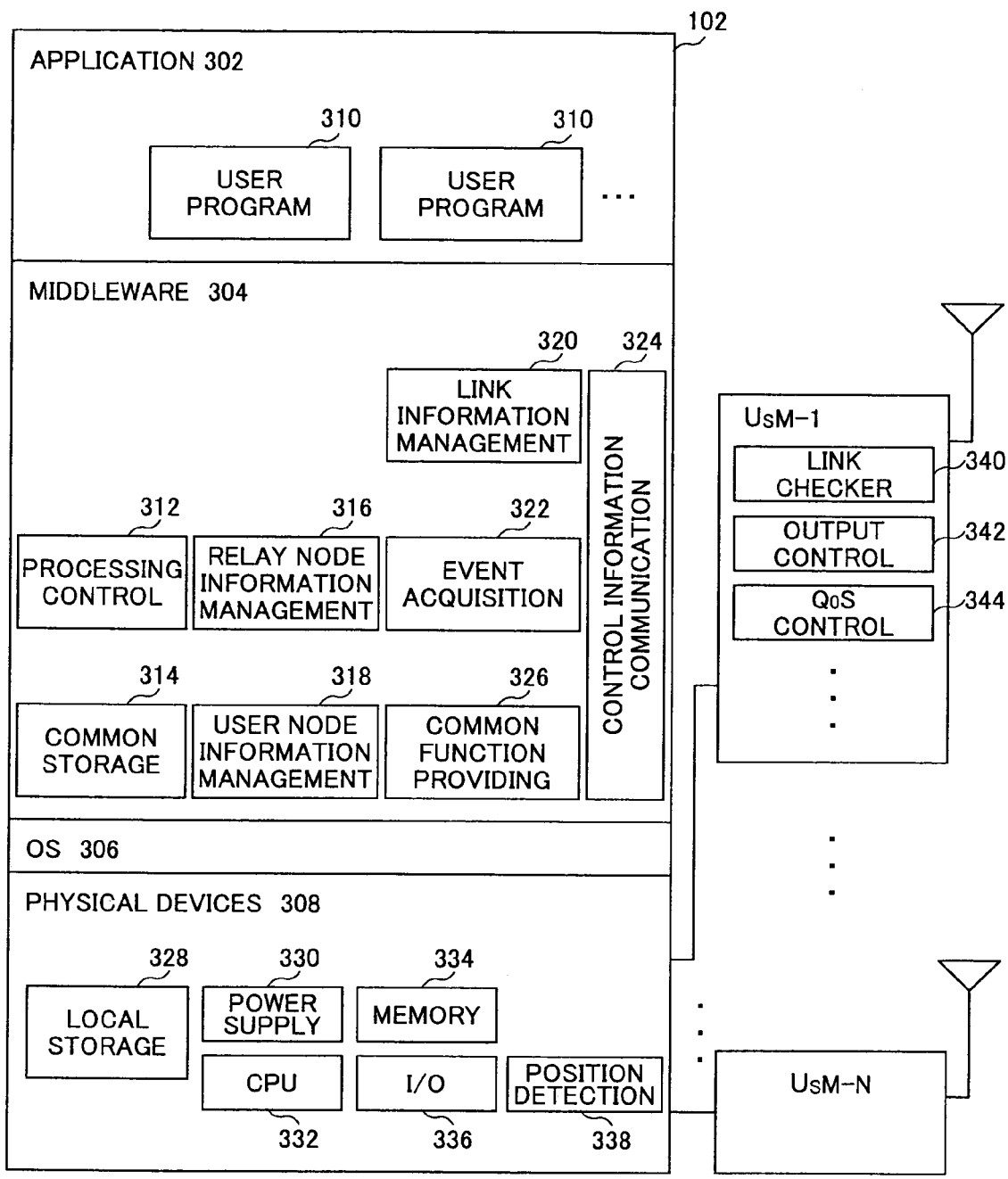
FIG. 3 is a block diagram showing functions of the user node 102.

FIG. 3 is a block diagram showing functions of the user node 102 loaded with the middleware UsA. The user node 102 comprises a software system including applications 302, middleware UsA 304, an operating system 306, and physical devices 308. The user node 102 has nearly the same middleware as the relay node 106, and the overlapping description is omitted.

Functionally, the middleware UsA 304 is between the applications 302 and the operating system 306, and realizes various functions together with the user programs 310. The functions of the middleware 304 may be divided into the following sections as shown in FIG. 3, that is, a processing control section 312, a common storage section 314, a relay node information management section 316, a user node information management section 318, a link information management section 320, an event acquisition section 322, a control information communication section 324, and a common function providing section 326. Certainly, alternative or additional functional sections may be provided to the middleware 304 when necessary.

The processing control section 312 transfers data in the received signal packets to a user program selected according to an identification number of the present communication session included in the received signal packets. Further, when receiving a request from the corresponding node 104 (for example, a request of services), the processing control section 312 decides whether the user node 102 communicates with the corresponding node 104 directly, that is, without going through the relay node 106, or indirectly, that is, going through the relay node 106.

When the relay node 106 and the user node 102 are connected, that is, the communication link between the relay node 106 and the user node 102 is established, and the port number shown by the packet signals from the corresponding node 104 is registered in the processing control section 312 by a user program 310 loaded in the user node 102, the relay node 106 transfers the packet signals to the user node 102. The packet signals are received by the processing control section 312, and the data in the packet signals are transferred to the corresponding user program 310 and are processed by the user program 310.

The common storage section 314 ensures that the data managed and stored on the relay node 106 are accessible from the user node 102, and that the data managed and stored in the user node 102 are accessible from the relay node 106. The common storage section 314 transfers the data stored in a local storage device 328, which is included in the physical devices 308 as shown in FIG. 3, to the relay node 106 in units of files, volumes, or others. Similarly, the common storage section 314 reads the data from the relay node 106 in units of files, volumes, or others, and stores the data in the local storage device 328. By doing this, even in case the communication link between the user node 102 and the relay node 106 is disconnected sometime later, the user node 102 is able to maintain communication with the corresponding node 104 using the stored data in the relay node 106.

Generally, the storage capacity of the local storage device 328 of the user node 102, for example, a mobile terminal, is smaller than that of the relay node 106, for example, a personal computer or a server. Therefore, it is preferable that the management of the user information be primarily performed at the relay node 106, and that the user node 102 reads the user data just when necessary.

The relay node information management section 316 manages information of resources of the relay node 106. The information managed by the relay node information management section 316 may include the static information such as the storage capacity of the local storage device 328, and the dynamic information such as the remaining capacity of the local storage device 228. The information managed by the relay node information management section 316 may be obtained from the relay node 106 via the control information communication section 324 regularly or when necessary.

The user node information management section 318 manages information of resources of the user node 102. The information managed by the user node information management section 318 may include static information such as the storage capacity of the local storage device 328, types of available communication links, and available input and output devices, and may further include dynamic information such as the remaining capacity of the local storage device 328, remaining capacity of the batteries, screen display, and other information of the user node devices. The above information may be obtained from the relay node 106 via the control information communication section 324 regularly or when necessary.

The link information management section 320 manages the network side monitors NsM-1 through NsM-N, each of which is provided in a communication link between the relay node 106 and the user node 102. The link information management section 320 manages the information provided by each network side monitor pertaining to the connection status of the communication links, the actual communication speed, the strength of the electrical signals, the communication quality, and mobility.

When a number of communication links are available, by utilizing these communication links automatically or according to the users' intent, the load of the communication links may be dispersed, and this enables high speed communications. Further, even when a communication link is disconnected, if other communication links are in good condition, it is possible to switch the disconnected communication link packets to one of the good communication links.

The event acquisition section 322, similar to the event acquisition section 222, notifies the user programs 310 of various events.

The common function providing section 326, similar to the common function providing section 226, provides APIs for utilizing the above numerous functions (sections).

The user side monitors UsM-1 through UsM-N, similar to the network side monitors NsM-1 through NsM-N, monitor the connection status of their respective communication links between the relay node 106 and the user node 102. The user side monitors UsM-1 through UsM-N may be formed integrally with the user node 102 such as a mobile terminal, or separately from the user node 102.

In the user node 102, an operating system (OS) 306 is loaded to perform system management in the user node 102 and provide a fundamental operational environment for users. The fundamental functions provided by the OS 306 are utilizable by user programs 310 through APIs.

The user node 102 comprises physical devices such as a local storage device 328, a power supply 330, a CPU 332, a memory 334, an IO (input/output) device 336, and a position detector 338. Certainly, the relay node 106 may include alternative or additional physical devices when necessary. The information in the relay node 106 is stored in the local storage device 328. The storage of the information is controlled by the common storage section 314 in the middleware 304. In addition to personal information of users, data created by users are also stored in the local storage device 328.

Figure 4:
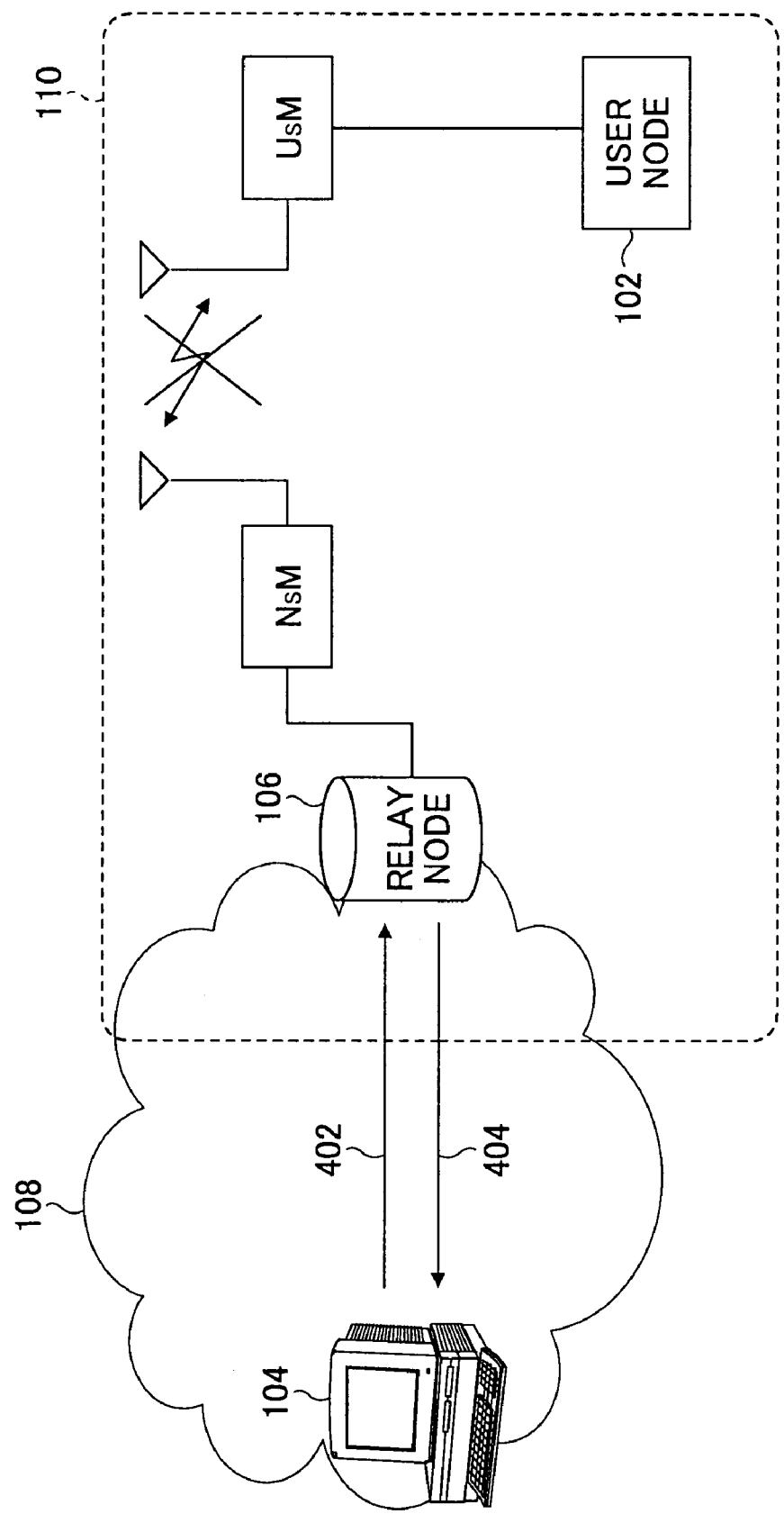
FIG. 4 is a view schematically showing the first example of the operations of the communication system according to the embodiment of the present invention.

FIG. 4 is view schematically showing the first example of the operations of the communication system according to the embodiment of the present invention. The basic configuration of the communication system in FIG. 4 is the same as that illustrated in FIG. 1, and the detailed description is omitted.

In this example, the user node 102 is a mobile terminal, such as a cellular phone. The radio links between the user node 102 and the corresponding node 104, and the user node 102 and the relay node 106 are in good condition at the beginning, so the user node 102 communicates with the corresponding node 104 and the relay node 106 through the radio links at the beginning. The local storage devices 228 and 328 store the necessary latest data, particularly, the local storage device 228 stores the latest data of the user node 102, and the local storage device 328 stores the latest data of the relay node 106.

In this example, it is assumed that the radio link between the user node 102 and the corresponding node 104, and the radio link between the user node 102 and the relay node 106 are disconnected at some time. Further, the corresponding node 104 makes a request to read the address book loaded in the cellular phone 102 after its radio link is disconnected, as indicated by the arrow 402.

After the corresponding node 104 makes the request 402, because the cellular phone 102 and the relay node 106 form the virtual node 110, and the relay node 106 is specified to have the same address as the virtual node 110, the request 402 is received by the relay node 106. The relay node 106 transfers the request to a relevant user program 210 in the relay node 106. After authentication of privilege of accessing the address book and confirmation of satisfaction of other necessary conditions, and on the basis of the user information stored in the local storage device 228, the requested address book is transmitted to the corresponding node 104, as indicated by the arrow 404.

As shown above, even when the communication link between the corresponding node 104 and the user node 102 is disconnected, the request from the corresponding node 104 is smoothly responded to. If the relay node 106 writes data into the local storage device 228 in the period when the radio link is broken, after the radio link is reconnected, the data of the user node 102 may be synchronized with the data of the relay node 106 and updated.

In this example, it is assumed the corresponding node 104 makes a request to read the address book in the user node 102. It is certain that the corresponding node 104 may make other kinds of requests, and the relay node 106 may respond to the requests as proxy for the user node 102, as described above.

Furthermore, the operation illustrated in FIG. 4 is just an example; the communication system of the present embodiment may perform numerous other operations. For example, when the relay node 106 is performing authentication, authentication of the user node 102 may also be required. In addition, the relay node 106 may also notify the corresponding node 104 in its response that perfect response to the request is difficult because the radio link is disconnected.

The communication system illustrated in FIG. 4 may also be understood as a video meeting system, and the user node 102 and the corresponding node 104 are communication terminals provided at places separated from each other.

Certainly, if the communication link between the user node 102 and the corresponding node 104 is disconnected, the video meeting cannot be continued. In this case, for example, the relay node 106, which is constantly connected to the corresponding node 104, may notify the corresponding node 104 that communication is stopped because of disconnect of the radio link between the user node 102 and the corresponding node 104. By making such a response, although the video meeting cannot be resumed, the present status and other relevant information may be reported to the corresponding node 104. In the related art, once the communication link is broken, it is impossible to acquire any information. The present invention is quite different from the related art in this respect.

Because the user programs 210 in the relay node 106 and the user programs 310 in the user node 102 can be created to realize various functions, it is possible for the relay node 106 to execute any desired procedures to make various responses to the corresponding node 104.

Figure 5:
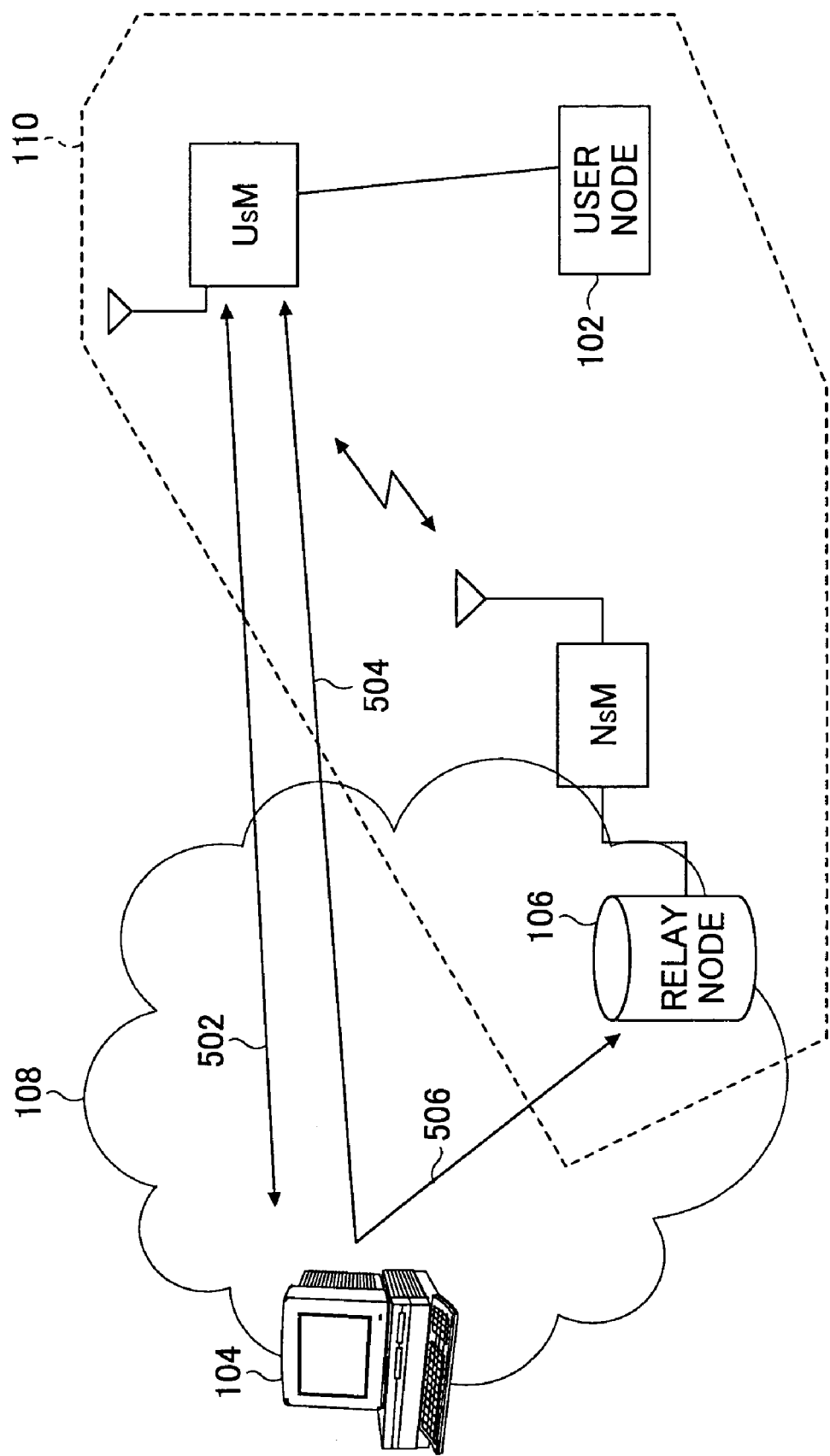
FIG. 5 is a view schematically showing the second example of the operations of the communication system according to the embodiment of the present invention.

FIG. 5 is view schematically showing the second example of the operations of the communication system according to the embodiment of the present invention.

In this example, originally the user node 102 is able to directly communicate with the corresponding node 104, that is, without going through the relay node 106. The arrow 502 in FIG. 5 indicates the direct communication between the user node 102 and the corresponding node 104. Further, based on the current situation, the user node 102 may decide whether indirect communication, that is, communication through the relay node 106, should be performed or not. Moreover, it is also possible to perform direct communication from one side to the other side, indirect communication from the other side to the one side. The selection of the above communication modes may be freely set by the user programs 210 and 310.

For example, even when the address of the relay node 106 is presented in the packet signals that should be transmitted from the user node 102 to the corresponding node 104 to specify the relay node 106 to be the source of transmission of the packet signals to the corresponding node 104, it is still possible to optionally include the address of the user node 102 in the packet signals to optionally specify the user node 102 as the source of transmission. When the corresponding node 104 receives such kind of signals, if the corresponding node 104 is able to decode the option, it decodes the option, obtains the address of the user node 102, and responds to the user node 102 directly without going through the relay node 106, as indicated by the arrow 504. On the other hand, if the corresponding node 104 is unable to decode the option, corresponding node 104 makes the response to the relay node 106, whose address is written in the packet signal as the source of signal transmission, as indicated by the arrow 506. The relay node 106 transfers this response to the user node 102. Accordingly, the user node 102 can appropriately select the communication paths.

When the communication link between the corresponding node 104 and the user node 102 is disconnected, the corresponding node 104 has no way to access the user node 102, and, for example, electric mail cannot be sent from the user node 102 to the corresponding node 104, even if a user at the user node 102 is intending to do so.

In the related art, when such a case occurs, the user has to wait until the communication link connection is restored. Because it is unknown to the user when the communication link connection will be restored, the user or the user program has to frequently send messages to confirm whether the communication link is re-connected.

In the present invention, the following processing may be performed.

First, the NsM and the link information management section 220 ascertain that the communication link between the corresponding node 104 and the user node 102 is disconnected.

Next, in order to provide notification of re-connection of the communication link to a mail distribution program in the user node 102 as soon as possible after the communication link is reconnected, the event of re-connection of the communication link is registered to the link connection queue of the event acquisition section 222, and the event acquisition section 222 is thereby placed on standby.

When this event happens, that is, when the communication link between the corresponding node 104 and the use node 102 is re-connected, the event acquisition section 222 notifies the mail distribution program of this, and the mail distribution program continues execution and resumes the interrupted mail distribution.

Hence, since neither the user nor the mail distribution program needs to confirm the reconnection of the communication link, mail can be distributed smoothly. In addition, in the present example, because it is possible to provide notification of re-connection of the communication link from the lower layer to the upper layer, the mail distribution program of the upper layer does not need to be concerned about the connection condition of the communication link. This is quite different from the related art.

Figure 6:
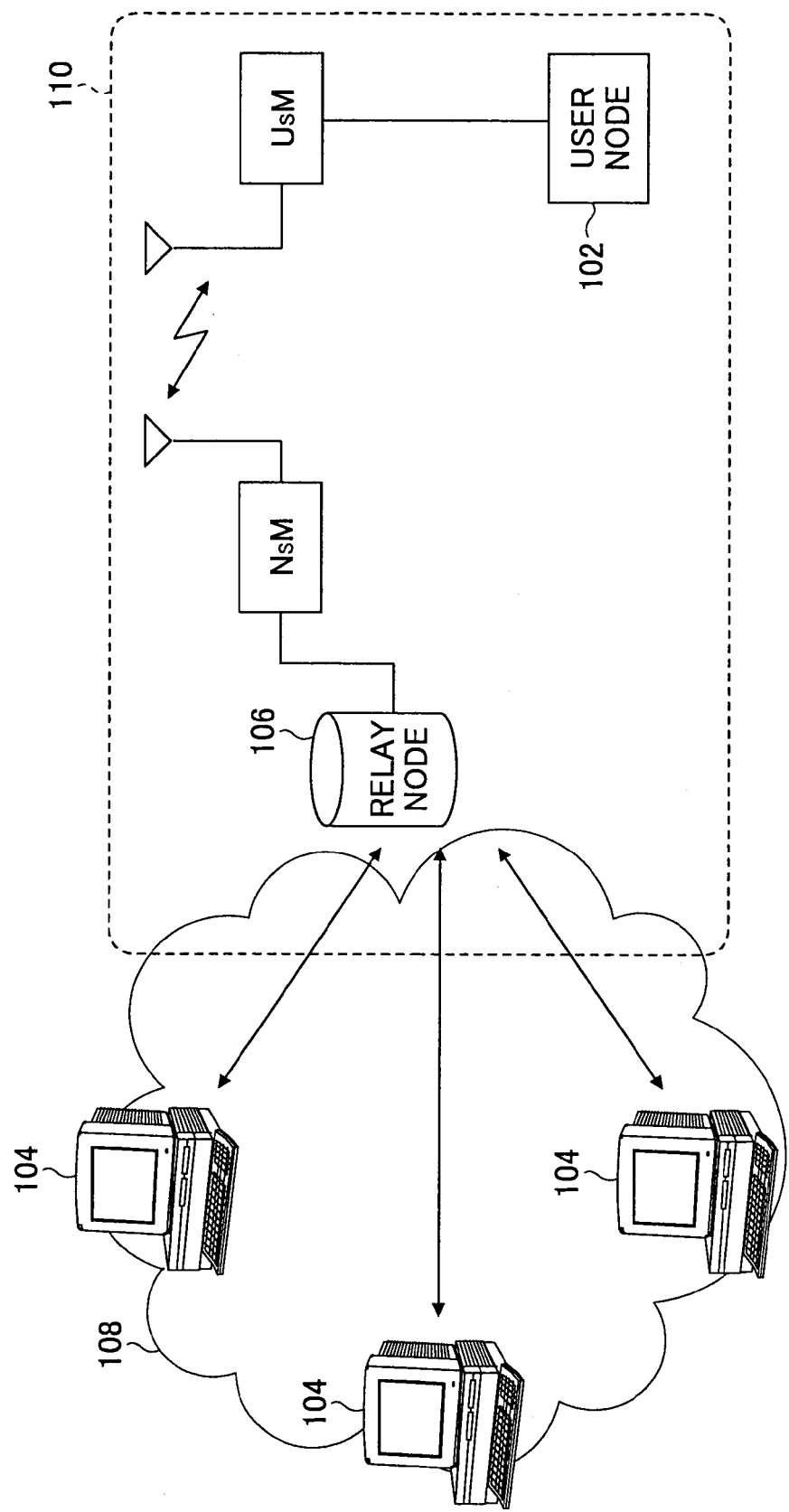
FIG. 6 is a view schematically showing the third example of the operations of the communication system according to the embodiment of the present invention.

FIG. 6 is view schematically showing the third example of the operations of the communication system according to the embodiment of the present invention.

In this example, it is assumed that the user node 102 communicates with a number of corresponding nodes 104, for example, to play an online game. Among the required processing in such communications, data input and output are performed by the user node 102, and calculations and communication operations are performed by the relay node 106. By doing this, the amount of communications is relatively small in the radio link between the user node 102 and the relay node 106, whereas the amount of communications is relatively large in the fixed link between the relay node 106 and the corresponding node 104. Thus, by dispersing the load of communication processing within the virtual node 110, it is possible to improve communication efficiency. Further, because the substantive calculations are performed by the relay node 106, it is possible to make more complicated calculations, and therefore provide a larger variety of services. Because of the limitation of the processing capability of the user node 102, which is a mobile terminal, for example, the user node 102 has difficulty in doing complicated calculations, just as in the related art.

From the point of view of communication efficiency, it is beneficial that the relay node 106 converts the data format and data size to match the communication capability of the user node 102 when the corresponding node 104 transmits data to the user node 102 through the relay node 106. For example, consider the case in which the user node 102 accesses a web page of a desired corresponding node 104 via the relay node 106. Here, each time the relay node 106 acquires data of the web page of the corresponding node 104, the relay node 106 performs appropriate data conversion based on the contents in the user node information management section 218 and the local storage device 228, for example, specification of the screen size, and then transmits the converted data to the user node 102. By doing this, useless data are not sent to the user node 102, and communication efficiency can be improved.

While the present invention has been described with reference to specific embodiments chosen for purpose of illustration, it should be apparent that the invention is not limited to the embodiments, but numerous modifications could be made thereto by those skilled in the art without departing from the basic concept and scope of the invention.

Summarizing the effect of the invention, even in a communication system wherein the communication link between nodes is not constantly connected, it is possible to provide services and make requests for services smoothly.

This patent application is based on Japanese priority patent application No. 2002-236674 filed on Aug. 14, 2002, the entire contents of which are hereby incorporated by reference.

What is claimed is:

1. A communication system, comprising:
a user node able to act as a server;
a corresponding node able to request communication with the user node; and
a relay node that is constantly connected to the corresponding node and is able to act as proxy of the user node to request to communicate with the corresponding node, said relay node and said user node acting as one virtual node with respect to the corresponding node,
wherein
the relay node includes
a first signal receiving unit that receives data from the corresponding node;
a first data processing unit that supplies the data to a program executed by a processor in the relay node according to a communication session identification number included in the data; and
a data transmitting unit that transmits the data processed by the first data processing unit to the user node, and
the user node includes a second data processing unit that supplies the data to a program executed by another processor on the user node according to the communication session identification number included in the data.

2. The communication system as claimed in claim 1, wherein the user node and the relay node act as a virtual node with respect to the corresponding node, the virtual node being identified by a node address of the relay node.

3. The communication system as claimed in claim 1, wherein data processed by the relay node are synchronized with data processed by the user node.

4. The communication system as claimed in claim 1, further comprising a link monitoring unit configured to monitor a communication link between the user node and the relay node.

5. The communication system as claimed in claim 1, further comprising a node information management unit configured to manage information and resources of the user node and the relay node.

6. The communication system as claimed in claim 1, wherein the user node is able to transmit signals to or receive signals from the corresponding node without going through the relay node.

7. The communication system as claimed in claim 1, wherein the relay node includes a common storage unit that reads data from, and transfers data to, the user node when a communication link between the relay node and the user node is connected.

8. A relay node in a communication system including a user node, a corresponding node able to request communication with the user node, and the relay node,
said relay node being constantly connected to the corresponding node, and being able to act as proxy for the user node to request communication with the corresponding node, said relay node and said user node acting as one virtual node with respect to the corresponding node,
said relay node comprising:
a signal receiving unit that receives data from the corresponding node;
a data processing unit that supplies data to a program executed by a processor in the relay node according to a communication session identification number included in the packet signal; and
a data transmitting unit that transmits the data to the user node.

9. The relay node as claimed in claim 8, wherein the relay node and the user node act as a virtual node with respect to the corresponding node, the virtual node being identified by a node address of the relay node.

10. The relay node as claimed in claim 8, wherein data processed by the relay node are synchronized with data processed by the user node.

11. The relay node as claimed in claim 8, further comprising a link monitoring unit configured to monitor a communication link between the user node and the relay node.

12. The relay node as claimed in claim 8, further comprising a node information management unit configured to manage information and resources of the user node and the relay node.

13. The relay node as claimed in claim 8, further comprising a common storage unit that reads data from and transfers data to the user node when a communication link between the relay node and the user node is connected.

14. A user node in a communication system including the user node, a corresponding node able to request to communicate with the user node, and a relay node that is constantly connected to the corresponding node and is able to act as proxy of the user node to communicate with the corresponding node, said user node comprising:
a data processing unit that supplies data from the corresponding node through the relay node to a program executed by a processor in the user node according to a communication session identification number included in the data, wherein the user node is able to request a communication with the corresponding node; and the user node and the relay node act as one virtual node with respect to the corresponding node.

15. The user node as claimed in claim 14, wherein the user node and the relay node act as a virtual node with respect to the corresponding node, the virtual node being identified by a node address of the relay node.

16. The user node as claimed in claim 14, wherein data processed by the user node are synchronized with data processed by the relay node.

17. The user node as claimed in claim 14, further comprising a link monitoring unit configured to monitor a communication link between the user node and the relay node.

18. The user node as claimed in claim 14, further comprising a node information management unit configured to manage information and resources of the user node and the relay node.

19. The user node as claimed in claim 14, wherein the user node is able to transmit signals to or receive signals from the corresponding node without going through the relay node.

20. The user node as claimed in claim 14, further comprising a common storage unit that reads data from and transfers data to the relay node when a communication link between the relay node and the user node is connected.

21. A method of operating a communication system including a user node, a corresponding node able to request a communication with the user node, and a relay node that is constantly connected to the corresponding node and is able to act as proxy of the user node to request a communication with the corresponding node, said relay node and said user node acting as one virtual node with respect to the corresponding node.

said method comprising the steps of:

receiving, by the relay node, data from the corresponding node;

supplying, by the relay node, the data to a program executed by a processor in the relay node according to a communication session identification number;

transmitting, by the relay node, the data to the user node; and supplying, by the user node, the data to a program by another processor in the user node according to the communication session identification number included in the packet signal.

22. The method as claimed in claim 21, wherein the user node and the relay node act as a virtual node with respect to the corresponding node, the virtual node being identified by a node address of the relay node.

23. The method as claimed in claim 21, wherein data processed by the relay node are synchronized with data processed by the user node.

24. The method as claimed in claim 21, wherein a communication link between the user node and the relay node are managed.

25. The method as claimed in claim 21, wherein information and resources of the user node and the relay node are managed.

26. The method as claimed in claim 21, wherein the user node transmits signals to or receive signals from the corresponding node without going through the relay node.

27. The method as claimed in claim 21, wherein the relay node reads data from and transfers data to the user node when a communication link between the relay node and the user node is connected.

* * * * *